United States Patent [19]

Tabor

[11] Patent Number: 5,478,867
[45] Date of Patent: Dec. 26, 1995

[54] MICROPOROUS ISOCYANATE-BASED POLYMER COMPOSITIONS AND METHOD OF PREPARATION

[75] Inventor: Ricky L. Tabor, Lake Jackson, Tex.

[73] Assignee: The Dow Chemical Company, Midland, Mich.

[21] Appl. No.: 268,059

[22] Filed: Jun. 29, 1994

Related U.S. Application Data

[63] Continuation-in-part of Ser. No. 88,473, Jul. 7, 1993, abandoned.

[51] Int. Cl.$^6$ ................................................ C08G 18/00
[52] U.S. Cl. ............................ 521/163; 521/128; 521/155
[58] Field of Search .......................... 521/137, 128, 521/155, 163, 174; 428/35, 68, 69

[56] References Cited

U.S. PATENT DOCUMENTS

| | | | |
|---|---|---|---|
| 3,574,150 | 4/1971 | Jefferson et al. | 521/63 |
| 3,625,871 | 12/1971 | Traubel et al. | 521/63 |
| 3,715,326 | 2/1973 | Traubel et al. | 264/41 |
| 3,920,588 | 11/1975 | Traubel et al. | 521/64 |
| 4,359,541 | 11/1982 | Patton, Jr. et al. | 521/137 |
| 4,444,821 | 4/1984 | Young et al. | 428/69 |
| 4,607,064 | 8/1986 | Kuhn et al. | 521/174 |
| 4,636,415 | 1/1987 | Barito et al. | 428/68 |
| 4,636,416 | 1/1987 | Kratel et al. | 428/69 |
| 4,661,529 | 4/1987 | Kuhn et al. | 521/137 |
| 4,667,417 | 5/1987 | Graser et al. | 34/9 |
| 4,668,555 | 5/1987 | Uekado et al. | 428/69 |
| 4,726,974 | 2/1988 | Nowobilski et al. | 428/69 |
| 4,745,015 | 5/1988 | Cheng et al. | 428/35 |
| 4,966,919 | 10/1990 | Williams, Jr. et al. | 521/54 |
| 4,997,804 | 3/1991 | Pekala | 502/418 |
| 5,018,328 | 5/1991 | Cur et al. | 50/406 |
| 5,084,320 | 1/1992 | Barito et al. | 428/69 |
| 5,086,085 | 2/1992 | Pekala | 521/187 |
| 5,091,233 | 2/1992 | Kirby et al. | 428/69 |
| 5,122,291 | 6/1992 | Wolff et al. | 252/62 |

FOREIGN PATENT DOCUMENTS

| | | |
|---|---|---|
| 0293211 | 11/1988 | European Pat. Off. . |
| 9500580 | 1/1995 | WIPO . |
| 9500581 | 1/1995 | WIPO . |

OTHER PUBLICATIONS

Rogovina, L. V. et al., Polymer Science of the USSR, vol. 26, No. 1, 1984, Oxford GB, "Rheological Properties of the gels obtained by solution polycyclotrimerization of Diisocyanates", pp. 202–210.

International Search Report dated Nov. 9, 1994 issued by the EPO acting as the International Searching Authority in PCT/US94/07600.

Smith et al., U.S. Patent Application, "Preparation of Low–Density Aerogels at Ambient Pressure for Thermal Insulation", (1992).

Pekala et al., International CFC and Halon Alternatives Conference, "Thermal Properties of Organic and Modified Inorganic Aerogels", (Aug. 1992).

Alviso et al., Polymer Preprints, vol. 32, "Melamine–Formaldehyde Aerogels", pp. 242–243, (1991).

Desphande et al., Journal of Non–Crystalline Solids, "Pore Structure Evolution in Silica Gel During Drying/Aging III. Effects of Surface Tension", vol. 144, pp. 32–44, (1992).

LeMay et al., Mrs Bulletin, "Low–Density Microcellular Materials", A Publication of the Materials Research Society, vol. XV, No. 12, pp. 19–44, (Dec. 1990).

Primary Examiner—Shelley A. Dodson
Attorney, Agent, or Firm—Barbara J. Tribble

[57] ABSTRACT

A novel microporous isocyanate-based xerogel composition is disclosed. The composition can be prepared by a method comprising (1) (1) admixing (a) a polyisocyanate component, (b) a substantially unreactive solvent, and, optionally, (c) a polymerization catalyst, water, an active-hydrogen compound or a mixture thereof, provided that (c) is included wherein (b) does not also function to catalyze polymerization; under reaction conditions sufficient to form a gel; and (2) removing the solvent under non-supercritical conditions sufficient to form a microporous xerogel composition. The compositions can be readily evacuated for use in thermal insulative applications such as vacuum panels, for uses such as appliance insulation, which show superior K-factor values when compared with, for example, conventional rigid polyurethane open-cell foams as used in similar applications.

11 Claims, No Drawings

MICROPOROUS ISOCYANATE-BASED POLYMER COMPOSITIONS AND METHOD OF PREPARATION

CROSS-REFERENCE TO A RELATED APPLICATION

This application is a continuation-in-part application of U.S. application Ser. No. 08/088,473, filed Jul. 7, 1993, now abandoned.

BACKGROUND OF THE INVENTION

The present invention relates to the field of isocyanate-based polymer foams, and particularly to those exhibiting utility in vacuum thermal insulating panels.

Thermal insulating materials have found wide use, particularly in the area of appliance applications, such as for refrigerators, where performance standards and limitations are frequently set by government agencies. At present the most frequently used materials for many insulation applications are rigid polyurethane foams, which are generally closed-cell foams. Choices of blowing agents used in preparing the foams affect the thermal conductivity, also called the K-factor, and promote conformance with governmental as well as manufacturers' specifications. The blowing agents most frequently used, and also most frequently governmentally regulated, include, for example, chlorofluorocarbon compounds and certain other halogenated compounds. These blowing agents have been generally found effective to allow K-factor values in the range of from 0.1 to 0.3 BTU*in./sq.ft.*hr.*degrees F. (14.4 to 43.2 mW/m degree K), but even lower K-factors will be needed in the future.

For appliance uses one approach to providing thermal insulation has been the use of vacuum insulation panels. Various designs of these panels have been disclosed, using different interior or "core" materials. A common core material is precipitated silica and other inorganic powders, which are processed using various ceramic techniques to provide the appropriate size and shape part. The part is then evacuated to a low pressure in order to decrease the K-factor in comparison with an unevacuated part. These parts often provide good thermal insulation, but their preparation may expose the preparer to environmentally-induced health problems. Another common core material is open-cell polyurethane foam, which can be similarly evacuated to decrease K factor. However, the K-factor of these commercial open-cell polyurethane foams, even upon evacuation, is generally much higher at a given pressure than the K-factor of precipitated silica-filled vacuum panels.

Some researchers have employed aerogels in their attempts to improve product K-factor values. Aerogels are defined as a special class of open-cell foams derived from the supercritical drying of highly cross-linked inorganic or organic gels. These materials have ultrafine cell/pore sizes (less than 1000 A), continuous porosity, high surface area (400–1000 m²/g), and a microstructure composed of interconnected colloidal-like particles or polymeric chains with characteristic diameters of 100 A. This microstructure is responsible for unusual optical, acoustic, thermal and mechanical properties. See, for example, LeMay, J. D., et al., "Low-Density Microcellular Materials", *MRS Bulletin*, A Publication of the Materials Research Society, Volume XV, Number 12 (December 1990).

For example, U.S. Pat. No. 5,122,291 discloses a thermal insulating material based on a pigment-containing silica aerogel. The method of preparation includes the supercritical processing required for aerogel production, and also flash vaporization of the inert liquid. U.S. Pat. No. 4,966,919 discloses composite foams which include a first foam having pore sizes from about 1 micron to about 30 microns and, incorporated therein, a second foam having pore sizes from about 0.01 micron to about 1.0 micron. Silica aerogel-filled polystyrene emulsion foams are included as suggested materials.

Further discussion of the preparation of ceramic aerogels is provided by, for example, Deshpande, et al., in "Pore Structure Evolution in Silica Gel During Drying/Aging. III. Effects of Surface Tension," in *J. Non-Cryst. Solids*, 144(1), 32–44 (1992). U.S. Pat. No. 4,667,417 discusses ceramic and organic aerogels which are prepared by drying of organic and inorganic hydrogels. Finally, Pekala, et al., in "Thermal Properties of Organic and Modified Inorganic Aerogels", a preprint available from Lawrence Livermore National Laboratory, calculated the optimum density for a hypothetical air-filled polyurethane aerogel, to find the average pore size needed for R=20 insulation value. Other researchers have disclosed aerogels prepared from melamine-formaldehyde, resorcinol-formaldehyde and a variety of other resin bases.

A problem encountered with many of the disclosed aerogels, whether organic or inorganic, however, is that they are expensive and difficult to prepare, because of their supercritical processing conditions. They also tend to be very fragile, shattering easily, which may present shipping and storage problems and may limit use in some applications. Because of these drawbacks, some researchers have looked at a lower cost alternative employing similar starting materials. When these materials are used to prepare cross-linked inorganic or organic sol-gels which are then dried by solvent evaporation under non-supercritical conditions, rather than supercritical high- or low-temperature extraction, the result is a xerogel. Xerogels are similar to aerogels in that they exhibit extremely fine pores and continuous porosity, but because of the difference in processing conditions tend to be denser and are more easily handled. Their porosity is dependent upon the precursor chemistry, but is generally less than 50 percent.

Because of the problems encountered with previously known means of providing insulation, particularly for appliance applications, many manufacturers are now seeking alternative approaches to providing thermal insulation. Accordingly, it is desirable to develop alternative compositions and methods of preparing insulative materials for these application.

SUMMARY OF THE INVENTION

The present invention is a microporous isocyanate-based xerogel composition. Preferably this composition has at least about 90 percent open pores; more preferably at least about 95 percent; and most preferably at least about 99 percent.

In another embodiment, the present invention is a microporous isocyanate-based xerogel composition prepared by a method comprising (1) admixing (a) a polyisocyanate component, (b) a solvent substantially unreactive with the polyisocyanate component, and, optionally, (c) a polymerization catalyst, water, an active hydrogen compound, or a mixture thereof, provided that (c) is included when (b) does not also function to catalyze polymerization; under reaction conditions sufficient to form a gel; and (2) removing the solvent under non-supercritical conditions sufficient to form a microporous xerogel composition. Also in some embodiments there is further included in the admixture an inorganic particulate material having a Brunauer, Emmett and Teller ("B.E.T.") surface area preferably greater than about 100 square meters/gram (m²/g).

In still another embodiment, the present invention is a method of preparing a microporous isocyanate-based xerogel composition comprising (1) admixing (a) a polyisocyanate component, (b) a solvent substantially unreactive with the polyisocyanate component, and, optionally, (c) a polymerization catalyst, water, an active hydrogen compound, or a mixture thereof, provided that (c) is included when (b) does not also function to catalyze polymerization; under reaction conditions sufficient to form a gel; and (2) removing the solvent under non-supercritical conditions sufficient to form a microporous xerogel composition.

In yet another embodiment, the present invention is a vacuum thermal insulative panel comprising an open-pore, microporous isocyanate-based xerogel composition which has been evacuated to a pressure of less than about 100 torr, preferably less than about 50 torr, and encapsulated in a gas- and water-tight sealed envelope. A method of preparing the vacuum thermal insulative panel is also disclosed.

Finally, the present invention is an insulative construction comprising (1) a thermal insulative panel containing an open-pore, microporous isocyanate-based xerogel composition which has been evacuated to a pressure of less than about 100 torr, preferably less than about 50 torr, and encapsulated in a gas- and water-tight sealed envelope, and (2) one or more additional insulative layers.

DESCRIPTION OF THE PREFERRED EMBODIMENTS

Using extremely simple processing techniques, the present invention provides compositions having superior insulative capability from a variety of starting materials. To date there have been no reports of the use of isocyanate materials to prepare xerogels, and also no reports of the surprisingly high porosity obtainable in such xerogels when isocyanate materials are used as precursors.

The first required starting material is a polyisocyanate component, which by definition has an average of two or more isocyanate groups. As used herein, the term "isocyanate-based" refers to the fact that each of the xerogel compositions of the present invention is prepared from starting materials including this polyisocyanate component. "Gel" as used herein includes true gels, i.e., fully or partially cross-linked materials swollen by solvent, and also sol-gels, which exhibit lower viscosity and a lesser degree of cross-linking. This is because it is known to those skilled in the art that there is a continuum in the transition between the sol state and the gel state, and in this transition process materials of both characters will often be present. "Xerogel", as used herein, is defined as a porous composition resulting from polymerization of one or more starting materials dissolved in a substantially unreactive solvent under reaction conditions sufficient to form a gel, followed by removal of the solvent under non-supercritical reaction conditions. The "polyisocyanate component" as defined herein includes polyisocyanate compounds per se, as well as mixtures of polyisocyanate compounds and monoisocyanate compounds such as phenylisocyanate, the mixture having a final average functionality of two or more. Included among preferred organic polyisocyanate compounds are aliphatic, cycloaliphatic and preferably multivalent isocyanates such as 1,6-hexamethylenediisocyanate; 1-isocyanato-3,5,5-trimethyl-1,3-isocyanatomethylcyclohexane; 2,4- and 2,6-hexahydrotoluenediisocyanate and the corresponding isomeric mixtures; 4,4'-, 2,2'- and 2,4'-dicyclohexylmethanediisocyanate and the corresponding isomeric mixtures; 2,4- and 2,6-toluenediisocyanate and the corresponding isomeric mixtures; 4,4'-, 2,4'- and 2,2'-diphenylmethanediisocyanate and the corresponding isomeric mixtures; mixtures of 4,4'-, 2,4'- and 2,2'-diphenylmethanediisocyanates and polyphenyl polymethylene polyisocyanates ("crude MDI"); mixtures of crude MDI and toluene diisocyanates; "crude TDI"; toluene diisocyanate distillation residue; and mixtures thereof. As used herein, the terms "crude MDI" and "crude TDI" refer to that mixture obtained in the reaction of a suitable primary amine (methanediphenyl diamine or toluene diamine) with phosgene prior to the removal of undesired by-products. It may include a minor proportion of any organic solvent which is used in the phosgenation step. Such by-products may include phosgene, HCl, tars, amine hydrochlorides, and other chlorine-containing impurities such as, for example, R—N—C(Cl)—N(COCl)—R, R—N(H)—COCl, R—N=CCl$_2$, wherein R represents the organic portion of the primary amine compound which as been phosgenated.

Also advantageously used for or in the polyisocyanate component are the so-called modified multivalent isocyanates, i.e., products which are obtained through chemical reactions of the above diisocyanates and/or polyisocyanates. Exemplary are polyisocyanates containing the following groups; esters, ureas, biurets, allophanates and preferably carbodiimides, isocyanurate and/or urethane groups containing diisocyanates and/or polyisocyanates.

Individual examples are aromatic polyisocyanates containing urethane groups, having NCO contents of from 2 to 33.6 weight percent, more preferably of from 21 to 31 weight percent, obtained by reaction of diisocyanates and/or polyisocyanates with, for example, lower molecular weight diols, triols, oxyalkylene glycols, dioxyalkylene glycols or polyoxyalkylene glycols having molecular weights up to 600 g/mol. These polyols can be employed individually or in mixtures as di- and/or polyoxyalkylene glycols. Included herein, for example, are diethylene glycols, dipropylene glycols, polyoxyethylene glycols, polyoxypropylene glycols and polyoxypropylenepolyoxyethylene glycols. Suitable also are prepolymers containing NCO groups, having NCO contents of from 2 to 30 weight percent, more preferably from 14 to 24 weight percent. Liquid polyoisocyanates containing carbodiimide groups and/or isocyanurate rings, having NCO contents of from 8 to 33.6 weight percent, more preferably from 21 to 31 weight percent can also be used. These include, for example, polyisocyanates based on 4,4'-, 2,4'- and/or 2,2'-diphenylmethanediisocyanate and the corresponding isomeric mixtures, 2,4' and/or 2,6-toluenediisocyanate and the corresponding isomeric mixtures; crude toluenediisocyanate; toluene diisocyanate distillation residues; 4,4'-, 2,4'- and 2,2'-diphenylmethanediisocyanate and the corresponding isomeric mixtures; mixtures of diphenylmethanediisocyanates and polyphenylpolymethylenepolyisocyanates (crude MDI); mixtures of toluenediisocyanates and crude MDI and/or diphenylmethanediisocyanates; and mixtures thereof.

Also useful in the present invention are: (i) polyisocyanates containing carbodiimide groups and/or urethane groups, from 4,4'-diphenylmethane diisocyanate or a mixture of 4,4'- and 2,4'-diphenylmethane diisocyanates having an NCO content of from 8 to 35 weight percent; (ii) prepolymers containing NCO groups, having an NCO content of from 10 to 30 weight percent, based on the weight of the prepolymer, prepared by the reaction of polyoxyalkylene polyols, having a functionality of preferably from 2 to 4 and a molecular weight of from 200 to 15,000 with 4,4'-diphenylmethane diisocyanate or with a mixture of 4,4'- and 2,4'-diphenylmethane diisocyanates and mixtures of (i) and (ii); and (iii) 2,4- and 2,6-toluenediisocyanate and the corresponding isomeric mixtures. Polymeric methylene diphenyl diisocyanate in any of its forms can also be used. In this case it preferably has an equivalent weight between 100 and 300, more preferably from 125 to 175, and an average functionality of at least 2. More preferred is an average functionality of from 2.5 to 3.5. The viscosity of the polyisocyanate component is preferably from 25 to 5,000 centipoise (cps), but values from 200 to 1,000 cps at 25° C. are preferred for ease of processing. Similar viscosities are preferred where alternative polyisocyanate components are selected.

The second required starting material is a solvent. Selection of this solvent is based on its suitability to act as a solvating agent for the starting materials, as well as its ability to act as a non-solvent for the final xerogel material. It must therefore allow formation of a gel during polymerization. Preferably the xerogels produced by the present invention can be further characterized as microporous isocyanate-based polymer structures having a bulk density from about 0.5 to about 50 pounds per cubic foot (lb/ft$^3$) and pore sizes averaging less than about 50 microns in diameter, although it is also possible for them to have bulk densities and pore sizes outside of these ranges. Included within the scope of the definition of microporous isocyanate-based polymers claimed herein are all microporous isocyanate-based xerogels. The solvent is also preferably relatively unreactive with the polyisocyanate, having a rate of reaction therewith that is less than, and preferably substantially less than, the rate of homopolymerization of the polyisocyanate component in the presence of a catalyst, or alternatively the rate of reaction between a polyisocyanate component and a selected active-hydrogen containing compound.

Preferred solvents include organic compounds containing functional groups selected from the groups consisting of, for example, ketones, aldehydes, amides, alkanes, ethers, halogens, aromatics, tertiary amines, alkenes, alkynes, nitros, esters, carbonates, phosphates, sulfoxides, phosphites, phosphates, nitrile, and mixtures thereof. Preferred solvents include, for example, acetone, methyl ethyl ketone, diisobutyl ketone, dimethyl formamide, tetrahydrofuran, pentane, hexane, dichloromethane, dimethyl acetamide, acetonitrile, methyl acetate, ethyl acetate, cyclohexanone, chloroform, toluene, nitromethane, triethyl amine, dimethyl sulfoxide, sulfur hexafluoride, dichloroethane, carbon disulfide, and mixtures thereof. Solvents also functioning as polymerization or trimerization catalysts are most preferred, including, for example, the amine-containing compounds listed hereinabove.

It is preferred that the solvent be used in an amount that is suitable to dissolve the xerogel starting materials, with the caveat that significant excess of solvent may prevent precipitation of a self-supporting xerogel polymer therefrom. Preferably this amount ranges from about 99 percent by volume to about 50 percent by volume, based on the total volume of the starting admixture. More preferably this amount ranges from about 98 to about 60 percent by volume, and most preferably from about 97 to about 70 by volume.

While isocyanate-based xerogels can be effectively prepared from just the polyisocyanate and solvent materials described hereinabove, wherein the solvent also functions as a polymerization catalyst to promote the homopolymerization of the polyisocyanate, in other embodiments of the present invention additional materials can be included in the reaction mixture. Thus, where the solvent does not also function as such a catalyst, at least one "optional" material is preferably included in the starting admixture. These optional materials include a polymerization catalyst, water, an active-hydrogen compound, or a mixture thereof. Such additional material(s) can be selected to customize the desired properties of the final polymer, without changing the basic isocyanate-based xerogel nature of the composition.

A polymerization catalyst can be optionally employed to increase the rate of homopolymerization of the polyisocyanate component, or reaction polymerization of the polyisocyanate component and water or active hydrogen compound, in the solvent. When an additional polymerization catalyst is employed, it is preferably selected from the group consisting of salts of carboxylic acids, especially alkali metal carboxylates, amine-containing compounds such as triethyl amine or tertiary amines, organo-metallic compounds, alkali hydroxides, alkali alcoholates, and mixtures thereof. Further examples are potassium acetate, soluble compounds of iron, sodium, potassium, and magnesium, triethylphosphine, and mixtures thereof.

When water is employed, it is preferably in the amount of from about 0.05 percent to about 6 percent, by volume based on the total volume of the starting reaction mixture. More preferably the water is used in an amount of from about 0.10 to about 3.0 percent by volume. Water addition tends to promote a hardening of the final xerogel composition. Even when water is not being intentionally added to the starting mixture, it should be kept in mind that some may be present in another component as received from certain manufacturers, for example, in the solvent.

A subclass of polymerization catalysts useful in the present invention include those generally termed in the art as "trimerization catalysts". These can be preferably included when it is found desirable to alter the density or compressive strength of the foam. For example, in some embodiments wherein a trimerization catalyst is used without the presence of water or other active hydrogen species, it tends to lower the density and therefore the compressive strength of the foam. Such a trimerization catalyst can be selected from, for example, tertiary amine compounds such as N,N-dialkylpiperazines; trialkylamines such as trimethylamine, triethylamine, and tributylamine; triethylene diamine, and the lower alkyl derivatives thereof, and N,N',N"-tris(dialkylaminoalkyl)hexahydrotriazines; mono-, di-, and tri(dialkylaminoalkylmonohydric phenols or thiophenols; and alkali metal carboxylates such as potassium acetate and potassium 2-ethyl hexanoate. The amount of the trimerization catalyst is preferably in a range of from 0.01 percent by volume to 5 percent by volume, more preferably from 0.1 to 1 percent by volume, based on total volume of the starting mixture.

It should be noted, however, that in cases where the solvent may function as a polymerization catalyst, as discussed above, it may be serving primarily or secondarily as a trimerization catalyst. This is particularly so when tertiary amine-based and other amine-containing solvents are selected. In this case the amount of such a catalyst would be calculated to be the same as the amount of solvent, i.e., preferably from about 99 to about 50 percent by volume, more preferably from about 98 to about 60 percent by volume, and most preferably from about 97 to about 70 percent by volume.

Active-hydrogen compounds can also be added to the reaction mixture. In general, the choice of active-hydrogen compound(s) allows control of the compressive strength of the resulting xerogel foam. For example, the use of polyamines tends to promote higher compressive strength than use of polyols in foams of the same density. The active hydrogen compounds useful herein are defined as any compound containing an active hydrogen site as determined by the Zerewitinoff Test. These can be selected from the group consisting of, for example, aliphatic and aromatic polyamine compounds, such as diethyltoluene diamine. Also useful in the present invention are aromatic and aliphatic polyether and polyester polyols and mixtures thereof. When a polyether and/or polyester polyol is selected, it is preferred that at least one polyamine also be included in the admixture. Among the polyethers suitable herein are the polyalkylene polyethers having at least two hydroxyl groups. These polyethers include the polymerization products of oxiranes or other oxygen-containing heterocyclic compounds, such as tetramethylene oxide prepared in the presence of a catalyst and/or initiated by water, and polyhydric alcohols having from two to eight hydroxyl groups, amine groups, or other active hydrogen sites. Preferably, the polyethers have at least some oxypropylene units produced from propylene oxide. As is known to those skilled in the art, the propylene oxide can be homopolymerized or copolymerized with one or more other oxiranes or other oxygen-containing heterocyclic compounds. The oxygen-containing heterocyclic compounds are preferably alkylene oxides.

The oxygen-containing heterocyclic compounds, hereinafter exemplified by but not limited to alkylene oxides, are suitably reacted either in mixture or sequentially. When more than one alkylene oxide is used, resulting polyethers can contain random, block, or random-and-block distributions of monomers. Mixtures of alkylene oxides most often produce randomly distributed alkylene oxide units. Sequential addition of different alkylene oxides most often produces blocks of the alkylene oxide segments in a polyether chain.

Exemplary oxiranes suitable for preparation of polyethers include ethylene oxide, propylene oxide, butylene oxide, amylene oxide, glycidyl ethers such as t-butyl glycidyl ether, and phenyl glycidyl ether. Other suitable oxiranes include 1,2-butylene oxide, 1,2-hexylene oxide, 1,2-decene oxide, 2-methoxy propylene oxide, methoxy ethylene oxide, 2,3-butylene oxide, 2,3-hexylene oxide, 3,4-decene oxide, and 1,1,1-trifluoromethyl-2,3-epoxyoctane. The polyethers are also prepared from starting materials such as tetrahydrofuran copolymerized with alkylene oxide; epihalohydrins such as epichlorohydrin, epiiodohydrin, epibromohydrin, 3,3-dichloropropylene oxide, 3-chloro-1,2-epoxypropane, 3-chloro-1,2-epoxybutane, 3,4-dichloro-1,2-epoxybutane, and 3,3,3-trichloropropylene oxide; arylalkylene oxides such as styrene oxide; and mixtures thereof. Preferably, the polyethers are prepared from alkylene oxides having from two to six carbon atoms such as ethylene oxide, propylene oxide, and butylene oxide.

More preferably, the polyethers are prepared from at least 10, more preferably at least 50, and even more preferably at least 80 percent of an alkylene oxide selected from the group consisting of propylene oxide, 1,2-butylene oxide, 2,3-butylene oxide or mixtures thereof. Most preferably, propylene oxide is selected. Homopolymers of propylene oxide, or copolyethers of propylene oxide with ethylene oxide, butylene oxide and mixtures thereof are most preferred for use in the practice of the invention.

Illustrative alcohols suitable for initiating formation of a polyalkylene polyether include glycerine, ethylene glycol, 1,3-propylene glycol, dipropylene glycol, 1,2-propylene glycol, 1,4-butylene glycol, 1,3-butylene glycol, 1,2-butylene glycol, 1,5-pentane diol, 1,7-heptane diol, 1,1,1-trimethylolpropane, 1,1,1-trimethylolethane, hexane-1,2,6-triol, alpha-methyl glucoside, pentaerythritol, erythritol and sorbitol, as well as pentols and hexols. Sugars such as glucose, sucrose, fructose, maltose and compounds derived from phenols such as (4,4'-hydroxyphenyl)2,2-propane, bisphenols, alkylphenols such as dodecylphenol, octylphenol, decylphenol and mixtures thereof are also suitable for forming polyether polyols useful in the practice of the invention. Mono-alcohols, preferably mono-alcohols having from 1 to 18 carbon atoms and alkoxy-substituted mono-alcohols, including methanol, ethanol, isomers of propyl alcohol, isomers of butyl alcohol, and ethers thereof, are also suitable for forming the hydroxy-functional polyethers.

Amines suitable for reaction with oxiranes to form polyethers include aliphatic and aromatic mono- and polyamines, optionally having substituents such as alkyl, carboxyl, carboalkoxy groups. Exemplary aromatic amines include aniline, o-chloroaniline, p-phenylene diamine, 1,5-diaminonaphthalene, methylene dianiline, the condensation products of aniline and formaldehyde, 2,4-diamino toluene, ethylene diamine, and toluene diamine. Exemplary aliphatic amines include methylamine, triisopropanolamine, isopropanolamine, diethanolamine, triethanolamine, ethylenediamine, 1,3-propylenediamine, 1,2-propylenediamine, 1,4-butylenediamine, and mixtures thereof.

The aliphatically bonded polyamines can be prepared by, for example, cyanoalkylation to form the nitrile, which can then be hydrogenated (see, for example, U.S. Pat. No. 3,267,050). Another means of preparing the aliphatically-bonded polyamines is to aminate a polyoxyalkylene polyol with ammonia in the presence of hydrogen and certain catalysts, as described in, for example, German Patent Application No. 12 15 373 based polyols are disclosed in further detail in, for example, U.S. Pat. No. 4,358,547.

Suitable polyoxyalkylene polyamines having amino groups in bonded form on the aromatic radical can be prepared by, for example, reacting the above mentioned polyoxyalkylene polyols with aromatic polyisocyanates in a ratio of NCO:OH groups of at least 2. The resulting prepolymers containing aromatic NCO groups can subsequently be hydrolyzed to form polyamines, as is known to those skilled in the art. The polyoxyalkylene polyamines can be employed as individual compounds or in mixtures from products having differing molecular weights and functionalities.

The polyethers, polyesters and polyamines useful in the present invention preferably have an average of from 1 to 8, more preferably from 2 to 4, hydroxyl groups per molecule. The polyethers also are preferably of relatively high molecular weight, having molecular weights ranging from 88 to 50,000, more preferably from 1,000 to 7,500. The term "relatively high molecular weight" as used herein refers to molecular weights in the 1,000 to 7,500 range. The polyethers may also preferably be capped, for example, with ethylene oxide used to cap propylene oxide, as is well-known to those skilled in the art.

The polyethers used in the present invention can be prepared by processes known to those skilled in the art, and are further discussed in, for example, *Encyclopedia of Chemical Technology*, Vol. 7, pp. 257–262, Interscience Publishers (1951); M. J. Schick, *Nonionic Surfactants*, Marcel Dekker, New York (1967); British Patent 898,306; and U.S. Pat. Nos. 1,922,459; 2,871,219; 2,891,073; and 3,058,921.

One or more catalysts are advantageously used in the preparation of the hydroxy-functional polyether. Conventional catalysts include alkali or alkaline earth metals or their corresponding hydroxides and alkoxides, Lewis acids, protonic acids, and coordination compounds. Thus, such catalysts preferably contain a Group IA or Group IIA metal ion.

One skilled in the art can readily determine suitable amounts of alkylene oxides, initiators, catalysts and adjuvants as well as suitable processing conditions for polymerizing the alkylene oxides. Additional sources of detail regarding polymerization of alkylene oxides include, for example, R. A. Newton, "Propylene Oxide and Higher 1,2-Epoxide Polymers" in *Encyclopedia of Chemical Technology*, 3rd ed., Vol. 10, R. Kirk and D. F. Othmer, John Wiley & Sons, New York (1982,) p. 633; D. J. Sparrow and D. Thorpe, "Polyols for Polyurethane Production" in *Telechelic Polymers: Synthesis and Application*, E. J. Goethals, CRC Press, Inc., Boca Raton, Fla. (1989), p. 181; J. Furukawa and T. Saegusa, *Polymerization of Aldehydes and Oxides*, Interscience, New York (1963), pp. 125–208; G. Odian, *Principles of Polymerization*, John Wiley & Sons, New York (2nd ed. 1970) pp. 512–521; J. McGrath, ed., *Ring-Opening Polymerization, Kinetics Mechanisms, and Synthesis*, American Chemical Society, Washington, D.C. (1985) pp. 9–21, 137–147 and 204–217; and U.S. Pat. Nos. 2,716,137; 3,317,508; 3,359, 217; 3,730,922; 4,118,426; 4,228,310; 4,239,907; 4,282, 387; 4,326,047; 4,446,313; 4,453,022; 4,483,941 and 4,540, 828.

Preferred catalysts used in preparing the active-hydrogen compounds are basic catalysts, more preferably hydroxides and alkoxides of alkali and alkaline earth metals, particularly cesium, sodium, potassium, barium, strontium and lithium. Potassium hydroxide is more preferred. When alkoxides are used as catalysts, the alkoxy groups advantageously contain from one to 36 carbon atoms. Exemplary of such alkoxides are alkoxides having anions of propylene glycol, glycerine, dipropylene glycol, propoxylated propylene or ethylene glycol.

Most preferred active hydrogen compounds for use in the present invention are diethyltoluene diamine, ethylene glycol, 1,4-butanediol, toluene diamine, 3,3'-dichloro-4,4'-diaminodiphenylmethane, methylene dianiline, ethylene diamine, hexamethylene diamine, trimethylol propane, ethanol amine, diethanol amine, triethanol amine, glycerin, and mixtures thereof.

When one or more active hydrogen compounds are employed, such are preferably in an amount of from about 0.1 percent to about 25 percent by volume, more preferably about 0.15 percent to about 15 percent by volume, and most preferably from about 0.5 percent to about 10 percent by volume, based on total starting material volume. When active hydrogen-containing species are utilized to form the xerogels in the presence of a trimerization catalyst, only very small amounts of active hydrogen containing compounds need to be present to significantly affect the final physical properties of the resulting xerogel composition. However, when the trimerization catalyst is not present or is present in extremely small quantity, it is preferred that the stoichiometric ratio of isocyanate groups to active hydrogen groups is from about 0.05 to about 5.0, more preferably from about 0.25 to about 2.0, in order to effect polymer precipitation and eventual formation of the gel.

The starting materials to prepare the microporous xerogel compositions of the present invention can also optionally further include inorganic particulate materials. These particulate materials can include, for example, precipitated silica, perlite, aluminum silicate, calcium silicate, fumed silica, and mixtures thereof. Such particulate materials can be selected to alter the resulting surface area and pore size distribution of the final xerogel composition. It is preferred that the Brunauer, Emmett and Teller ("B.E.T.") surface area of the selected particulate matter be at least about 100 m$^2$/g, more preferably at least about 200 m$^2$/g.

Once the starting materials have been selected they are combined using any process known in the art which promotes or allows polymerization. In the case of polyisocyanate and a solvent wherein the polyisocyanate homopolymerizes in the presence of the solvent and, preferably, the polymerization catalyst, to form the final isocyanate-based xerogel composition. Simple mixing, including hand- or other mechanical mixing, at ambient conditions is generally sufficient to ensure homogeneity of composition. However, high shear mixing or pumping through mixheads, can also be employed. When additional components, such as an active-hydrogen compound, a polymerization catalyst (which may or may not be a trimerization catalyst) and/or water, are selected, the gellation rate can be further controlled based on the type and amount of such compound. Therefore, it is relatively easy for those skilled in the art to ensure that there is ample time to enable processing of the reaction mixture into a panel or molded part using conventional industrial methods.

Furthermore, a wide range of reaction conditions may be employed, which will further affect the rate of formation and, potentially, characteristics of the final novel microrporous isocyanate-based xerogel compositions of the present invention. It is preferred that the components be reacted at a temperature preferably from the freezing point of the solvent to just below its boiling point. Given the requirement that the solvent is a liquid, the temperature range is more preferably from 10° C. to 150° C. Pressures preferably range from subambient to about 200 psig, more preferably from ambient to about 80 psig. According to temperature, pressure, and other reaction variables such as mix speed, catalyst type and level and active hydrogen compound reactivity and amount, the time of reaction to form the gel is preferably from 1 second to 8 hours, more preferably from 10 seconds to 3 hours. A cure time after formation of the gel may in some cases be indicated, and may be allotted from 2 minutes to 16 hours, to allow the gel to cure, i.e., to complete cross-linking and therefore to ensure that the proportion of gel is maximized while the proportion of sol is minimized or preferably entirely converted to gel. This may help to ensure that the final xerogel prepared from the gel exhibits maximum strength. However, in some cases such cure time may not be necessary or desirable.

After formation of the gel and cure time as appropriate, it is necessary to remove the solvent in order to form the xerogel. In order to maintain the character of the composition, it is necessary to remove the solvent under non-supercritical conditions. Preferred means of solvent removal include, for example, evaporation, gas purge-assisted evaporation, and vacuum-assisted evaporation.

The process described hereinabove preferably forms a microporous, open-pore xerogel composition which may exhibit superior thermal insulative value when the xerogel composition is used in a vacuum thermal insulation panel. Cell size of the final composition is preferable extremely small, averaging on the order of about 50 microns or less, preferably about 30 microns or less. By thus eliminating the thermal insulation value of the cell gas, the total K factor may be reduced by an average of 60–70 percent relative to conventional rigid, closed-cell foams. Thus, the xerogel compositions of the present invention are ideally suited for use in insulative vacuum panels.

The final novel isocyanate-based xerogel composition preferably has at least about 90 percent open pores, more preferably at least 95 percent, and most preferably at least about 99 percent, and preferably has a density of from about 0.5 to about 50 lb/ft$^3$, more preferably from about 1 to about 30 lb/ft$^3$. In cases where the starting materials include isocyanate-reactive materials such as polyols, polyamines and the like, the xerogel may be characterized as, for example, a polyurethane, polyurea, polyurethane/polyurea or polyisocyanurate xerogel. While a xerogel composition of the present invention can be used as a vacuum panel filler or core, it may also be suitable for use as, for example, a catalyst support, filter, chromatographic packing or acoustic absorber. In the case of a vacuum panel, the xerogel material would preferably be a core which has been encapsulated in a gas- and water-tight envelope. Such envelope may comprise a metal such as aluminum, and/or a thermoplastic material such as polyethylene polyvinyl alcohol, poly(acrylonitrile), ethylene vinyl alcohol copolymers, polyvinylidene chloride, cellulose, polyethylene terephthalate, poly(benzoxazole), poly(benzimidazole), poly(benzothiazole), polyethylene, polypropylene, an ethylene/vinyl acetate copolymer, an ethylene/alpha olefin copolymer, a polyamide or a combination thereof. Preferred envelope materials are multilayer film structures containing a combination of barrier and sealant thermoplastic materials, together with at least one layer of metal and/or ethylene/vinyl alcohol copolymer. Such multilayer envelopes frequently offer a highly desirable combination of durability, light weight and ease of processing, while at the same time ensuring maintenance of the vacuum and seal against gas and water penetration.

The vacuum panel can be constructed using any means commonly employed to construct such. Descriptions of such means are found in, for example, U.S. Pat. No. 4,668,555; 5,018,328; 4,444,821; and 5,066,437. In a preferred embodiment a novel xerogel composition of the present invention is first molded or cut into a shape, partially encapsulated by a gas- and water-tight envelope, evacuated to a pressure less than 100 torr, more preferably less than 50 torr, and the envelope is sealed to complete the encapsulation and to hold the vacuum within the structure. Getters may be employed as described in U.S. Pat. No. 5,018,328, incorporated herein by reference in its entirety, to maintain low pressure within the panel for long periods of time. Sealing may be accomplished by conventional means such as heat sealing, or sealing by means of radio, microwave, or ultrasonic sealing techniques.

The final vacuum panel is preferably constructed such that a K-factor of 0.01 to 0.08 is exhibited. This K-factor represents a substantial improvement over K-factors of most rigid, closed-cell polyurethane foams prepared using conventional blowing agents. Further improvements in thermal insulative capability can be provided by inclusion of additional thermal insulative layers in an insulative construction which comprises the isocyanate-based xerogel composition of the present invention as well as such additional layer(s). Such additional layer(s) may include thermoset and thermoplastic materials, and combinations thereof, such as cellular and non-cellular forms of polyurethane, polystyrene, polyisocyanurate, polyurea, polyethylene, polyethylene terephthalate, polybutylene terephthalate, styrene/butadiene block copolymers, acrylonitrile/butadiene/styrene copolymers, polypropylene, styrene/isoprene copolymers, and thermoplastic polyurethane. Such thermal constructions are well suited for use in the appliance and building industry in particular.

The following examples are given to illustrate the present invention and are not intended to be, nor should they be construed as being, limitative of its scope in any way.

EXAMPLE 1

A polyurea xerogel is prepared by reacting 9.98 Kg of acetone with 419 g of polymeric diphenylmethane diisocyanate having an equivalent weight of 134.5 g/equivalent. 266 g of diethyltoluene diamine is then added to the reaction mixture and the mixture is thoroughly stirred manually for 15 seconds. The reaction mixture is then poured into a cardboard mold measuring 16 inches by 20 inches by 4 inches, which has been lined with two layers of 1 mil polyethylene film. The solution is then covered with aluminum foil and allowed to stand undisturbed for three hours. At this point the aluminum foil is removed and the acetone is allowed to evaporate over a period of 1 to 2 days to form the xerogel composition.

The resulting xerogel is removed from the mold and placed in a vacuum oven at 100° C. for about 16 hours. A panel having a density of 7 lb/ft$^3$ and measuring 7.75 inches by 10 inches by 0.75 inches is cut from the resulting dried material. The average pore size of this material is approximately 10 microns, as determined by scanning electron microscopy, and the Brunauer, Emmett and Teller ("B.E.T.") method of surface area determination is employed to yield a value of 98 m$^2$/g.

The panel is then heat sealed into a pouch made up of a metallized multilayer DRYFLEX* #3 film on one side, and a layer of OMNIFLEX* C44-442 on the other side. *DRYFLEX is a tradename of Riley and Geehr, Inc. and the product is composed of layers of Nylon-6, low density polyethylene (LDPE) adhesive, a metal and ethylene vinyl acetate copolymer heat seal. The DRYFLEX* film is 4.5 mil thick. *OMNIFLEX is a tradename of Riley and Geehr, Inc., and the product is an eight-layer gas barrier film having a total measured thickness of 4.5 mil. This multilayer film consists of layers of Nylon-6, recycle, ethylene-vinyl acetate copolymer, ethylene-vinyl alcohol copolymer, and linear low density polyethylene. A vacuum hose connector is adhered to one edge of the pouch using hot melt glue and a hole punctured through the center of the connector in such a way as to allow a vacuum to be applied to the interior of the pouch and measured via a vacuum gauge. The K-factor is measured as a function of pressure in an ANACON* K-factor instrument, yielding the results shown in Table 1. (*ANACON is a trademark of High Voltage Engineering Corporation.)

TABLE 1

| Pressure (torr) | K-Factor (BTU*in/sq.ft*hr*deg. F.) | K-Factor mW/m degree K. |
| --- | --- | --- |
| 0.18 | 0.045 | 6.48 |
| 0.53 | 0.049 | 7.06 |
| 0.78 | 0.058 | 8.35 |
| 0.97 | 0.065 | 9.36 |
| 1.15 | 0.070 | 10.08 |
| 1.28 | 0.074 | 10.66 |
| 1.45 | 0.080 | 11.52 |
| 1.60 | 0.086 | 12.38 |
| 1.75 | 0.089 | 12.82 |
| 2.55 | 0.109 | 15.70 |
| 2.80 | 0.114 | 16.42 |
| 2.95 | 0.118 | 16.99 |
| 4.2 | 0.140 | 20.16 |
| 5.0 | 0.150 | 21.6 |
| 8.7 | 0.181 | 26.06 |
| 28.0 | 0.225 | 32.4 |
| 90.0 | 0.244 | 35.14 |
| 450 | 0.256 | 36.86 |
| 760 | 0.264 | 38.02 |

EXAMPLE 2—COMPARATIVE

An open-cell polyurethane foam vacuum panel is prepared to compare its insulative capability with the polyurea xerogel vacuum panel prepared in Example 1. The density of the conventional foam is 5 lb/ft$^3$, the B.E.T. surface area is 0.1 m$^2$/g, the pore size averages 120 microns, and the open cell content is greater than 96 percent. This open cell foam is prepared as a box foam and the "B-side" is made from the following formulation:

TABLE 2

| Component | Parts per 100 parts of total formulation |
|---|---|
| Polyol A | 50.0 |
| Polyol B | 50.0 |
| Polyol C | 4.0 |
| Polyol D | 15.0 |
| Glycerin | 2.0 |
| Surfactant | 1.5 |
| Water | 5.0 |

"Polyol A" is a propylene oxide-based diol which is amine-initiated, having an equivalent weight of 70 and a functionality of 4. "Polyol B" is a sucrose/glycerin-initiated polyol having an equivalent weight of 115 and a functionality of 4.4. "Polyol C" is an ethylene oxide/propylene oxide heterofed polyol which is glycerin/sucrose-initiated, has an equivalent weight of 1800 and a functionality of 6.9. "Polyol D" is a glycerin-initiated, poly(propylene oxide) triol capped with ethylene oxide to have an equivalent weight of 1650. "Surfactant" is DC-5241, a silicone surfactant available from Air Products and Chemicals, Inc.

The panel is prepared by inserting a foam panel measuring 7.75 inches by 10 inches by 0.75 inches into a pouch made of the same materials as described in Example 1. The pouch is sealed and evacuated exactly as described in that Example. K-factor measurements are shown in Table 3.

TABLE 3

| Pressure (torr) | K-Factor (BTU*in/sq.ft*hr*deg. F.) | K-Factor mW/m degree K. |
|---|---|---|
| 0.15 | 0.144 | 20.74 |
| 0.34 | 0.152 | 21.89 |
| 0.39 | 0.159 | 22.90 |
| 0.55 | 0.183 | 26.35 |
| 0.65 | 0.195 | 28.08 |
| 0.72 | 0.202 | 29.09 |
| 0.80 | 0.210 | 30.24 |
| 0.88 | 0.218 | 31.39 |
| 1.08 | 0.231 | 33.26 |
| 1.70 | 0.258 | 37.15 |
| 2.50 | 0.273 | 39.31 |
| 4.50 | 0.288 | 41.47 |
| 22.0 | 0.301 | 43.34 |
| 200 | 0.302 | 43.49 |

EXAMPLE 3—COMPARATIVE

A precipitated silica vacuum panel is prepared and tested to determine its K-factor performance to enable comparison with the polyurea xerogel prepared in Example 1. In this comparative example precipitated silica (310 g, FK500 silica obtained from Degussa Chemical Corporation) is placed in a TYBEK* non-woven polyethylene porous fabric pouch containing a PLEXIGLAS* open-ended, squared U-shaped frame which is ¾ inch thick, and measures 7 and ⅝ inches on each side. (*TYBEK is a trademark of E.I. du Pont de Nemours & Co., Inc. *PLEXIGLAS is a trademark of Rohm & Haas Co.) The width of the PLEXIGLAS* is ⅜ inch. The purpose of the frame is to act as a mold for the silica powder. The pouch is heat sealed and stored at 95° C. under vacuum for 24 hours. The resulting powder pouch is placed into another pouch made of the same materials as in Example 1. This pouch is then heat-sealed and pressed to flatness in an unheated press using as low a compression pressure as possible to provide a flat surface on the two largest sides of the vacuum panel. A vacuum hose connector is adhered to one edge of the pouch using hot melt glue and a hole punctured through the center of the connector in such a way as to allow a vacuum to be applied to the interior of the pouch and measured via a vacuum gauge. The K-factor is measured as a function of pressure in an ANACON* K-factor instrument, as provided in Example 1. Results are shown in Table 4.

TABLE 4

| Pressure (torr) | K-Factor (BTU*in/sq.ft*hr*deg. F.) | K-Factor mW/m degree K. |
|---|---|---|
| 0.16 | 0.058 | 8.35 |
| 0.50 | 0.059 | 8.50 |
| 4.80 | 0.075 | 10.8 |
| 10.2 | 0.090 | 12.96 |
| 20.0 | 0.109 | 15.70 |
| 28.0 | 0.115 | 16.56 |
| 40.0 | 0.127 | 18.29 |
| 180 | 0.157 | 22.61 |
| 230 | 0.166 | 23.90 |
| 330 | 0.182 | 26.21 |
| 760 | 0.227 | 32.69 |

From a comparison of the results of Tables 1, 3 and 4, it can be seen that the vacuum panel prepared using the polyurea xerogel performs comparably to the precipitated silica panel, and considerably better than the conventional polyurethane rigid foam panel.

EXAMPLES 4–12

Samples 4–12 are prepared using the experimental procedure of Example 1 but including additional active-hydrogen materials as starting components. The formulations for these examples are given in Table 5. In that table the following definitions apply: "Polyisocyanate" refers to PAPI*-27, which is a polyphenyl polymethylene polyisocyanate having an average functionality of 2.7 and an equivalent weight of 134, available from The Dow Chemical Company; "Diethyl toluene diamine" and "Dithiomethyl toluene diamine" are amine-based active-hydrogen materials; "Dithiomethyl toluene diamine" is ETHACURE* 300, available from Ethyl Corporation; "Trimerization Catalyst" is potassium 2-ethylhexanoate, which is HEXCEM* 977, available from Moody Chemical Company; and "Precipitated silica" is FK-500, which is available from Degussa Chemical Corporation.

TABLE 5

| Component | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|
| Polyisocyanate, g | 12.6 | 12.6 | 12.6 | 12.6 | 12.6 | 12.9 | 10.8 | 12.0 | 15.6 |
| Diethyl toluene diamine, g | 8 | 8 | 8 | 8 | 4 | — | 8 | 8 | 8 |
| Acetone, g | 300 | — | 300 | 31.5 | 300 | 300 | 175 | 225 | 340 |
| Methylene chloride, g | — | 500 | — | — | — | — | — | — | — |
| Dimethyl formamide, g | — | — | — | — | — | — | — | 75 | — |
| Trimerization Catalyst, g | — | — | — | — | 2.5 | — | — | — | — |
| Dithiomethyl toluene diamine, g | — | — | — | — | — | 10.3 | — | — | — |
| Precipitated silica, g | 2.0 | — | — | — | — | — | — | — | — |
| Bulk density, lb/ft$^3$ | 9.0 | 9.3 | 8.2 | 10.3 | 15.9 | 9.0 | 10.7 | 8.5 | 9.2 |
| Bulk density, Kg/m$^3$ | 144 | 149 | 131 | 165 | 255 | 144 | 171 | 136 | 147 |

—denotes not present as a starting component.

EXAMPLES 13–21

Samples 13–21 are prepared similar to those of Examples 4–12 but each including water in the admixture. Their formulations are shown in Table 6. In that table terms are given the following definitions: "Polyisocyanate A" is PAPI* 27, as described in the previous examples; "Polymerization catalyst A" is POLYCAT* 8, which is N,N-dimethyl cyclohexylamine, available from Air Products and Chemicals, Inc; "Polyisocyanate B" is toluene diisocyanate; "Trimerization catalyst" is potassium 2-ethylhexanoate, which is HEXCEM* 977, which is as described in the previous examples; "Polymerization catalyst B" is a 70 percent solution of bis(N,N-dimethylethyl)ether in dipropylene glycol, available from Union Carbide Corporation; and "Polyol E" is triethanolamine.

TABLE 6

| Component | Ex. 13 | Ex. 14 | Ex. 15 | Ex. 16 | Ex. 17 | Ex. 18 | Ex. 19 | Ex. 20 | Ex. 21 |
|---|---|---|---|---|---|---|---|---|---|
| Polyisocyanate A, g | 21.0 | 21.0 | 21.9 | 21.9 | — | 27.0 | 14.6 | 21.0 | 23.5 |
| Water, g | 1.4 | 1.4 | 1.4 | 1.4 | 2.0 | 1.4 | 1.4 | 1.4 | 1.4 |
| Acetone, g | 230 | 230 | 400 | 400 | 250 | 390 | 225 | 400 | 400 |
| Polymerization catalyst A, g | 0.25 | 0.5 | 0.5 | 3.0 | — | 0.5 | 0.5 | — | — |
| Polyisocyanate B, g | — | — | — | — | 20 | — | — | — | — |
| Trimerization catalyst, g | — | — | — | — | 1.70 | — | — | — | — |
| Polymerization catalyst B, g | — | — | — | — | — | — | — | 0.2 | 0.5 |
| Polyol E, g | — | — | — | — | — | — | — | — | 1.0 |
| Bulk density, lb/ft$^3$ | 8.4 | 12.0 | 7.4 | 38.1 | 18.5 | 7.9 | 17.7 | 11.2 | 11.3 |
| Bulk density, Kg/m$^3$ | 135 | 192 | 119 | 610 | 257 | 127 | 283 | 179 | 181 |

—denotes not present as a starting component.

EXAMPLES 22–27

Samples 22–27 are prepared similar to those of Examples 4–12 and 13–21 but each including a specific trimerization catalyst in the admixture, without additional materials such as water or other active-hydrogen compounds. One sample, #27, also contains perlite. Their formulations are shown in Table 7. In that table "Polyisocyanate A" and "Polyisocyanate B" are the same as in Examples 13–21, and "Trimerization catalyst" is the same as "Trimerization catalyst" in Examples 13–21.

TABLE 7

| Component | Ex. 22 | Ex. 23 | Ex. 24 | Ex. 25 | Ex. 26 | Ex. 27 |
|---|---|---|---|---|---|---|
| Polyisocyanate A, g | 20 | 20 | 20 | 20 | — | 20 |
| Polyisocyanate B, g | — | — | — | — | 20 | — |
| Trimerization catalyst, g | 1.0 | 2.0 | 3.0 | 2.5 | 1.7 | 2.0 |
| Acetone, g | 500 | 250 | 250 | 250 | 330 | 250 |
| Perlite, g | — | — | — | — | — | 10 |
| Bulk density, lb/ft$^3$ | 7.8 | 5.4 | 12.8 | 3.5 | 20.6 | 4.5 |
| Bulk density, Kg/m$^3$ | 125 | 86 | 205 | 56 | 330 | 72 |

—denotes not present as a starting component.

EXAMPLE 28

A xerogel composition of the present invention is prepared by admixing 118 g of PAPI* 27, 75.6 g of diethyltoluene diamine, 90 g of precipitated silica (FK-500), and 282.6 g acetone. The silica is dispersed in the acetone by means of a high shear mixer for 30 seconds prior to admixing the remaining components therewith. Following the same general procedures as in Example 1, the formulation is then poured into an 11 inch by 11 inch by 2 inch mold which has been lined with polyethylene. As in Example 1, the final xerogel panel is then heat sealed into a pouch or envelope which is a combination of DRYFLEX* #3 and OMNIFLEX* C44-442 and evacuated. A comparison of evacuation pressure and resulting K-factor is shown in Table 8.

TABLE 8

| Pressure (torr) | K-Factor (BTU*in/sq.ft*hr*deg. F.) | K-Factor mW/m degree K. |
|---|---|---|
| 0.230 | 0.048 | 6.91 |
| 0.230 | 0.048 | 6.91 |
| 0.95 | 0.082 | 11.81 |
| 1.10 | 0.089 | 12.82 |
| 1.50 | 0.104 | 14.98 |
| 5.0 | 0.176 | 25.34 |
| 9.5 | 0.211 | 30.38 |
| 50 | 0.257 | 37.00 |
| 100 | 0.265 | 38.16 |
| 150 | 0.269 | 38.74 |
| 340 | 0.276 | 39.74 |
| 780 | 0.275 | 39.60 |
| 850 | 0.262 | 37.73 |

What is claimed is:

1. A microporous polyurea xerogel composition having pores averaging less than about 50 microns in diameter and having a bulk density from about 1 to about 30 lb/ft$^3$ (about 16.0 to about 481 Kg/m$^3$).

2. A microporous polyurea xerogel composition prepared by a method comprising (1) admixing (a) a polyisocyanate component, (b) a substantially unreactive solvent, and (c) an aliphatic or aromatic polyamine compound; under reaction conditions sufficient to form a gel; and (2) removing the solvent under non-supercritical conditions sufficient to form a microporous polyurea xerogel composition having pores averaging less than about 50 microns in diameter and having a bulk density from about 1 to about 30 lb/ft$^3$ (about 16.0 to about 481 Kg/m$^3$).

3. The composition of claim 2 wherein the mixture further comprises a polymerization catalyst, water or a mixture thereof.

4. The composition of claim 2 wherein the polyisocyanate component is selected from the group consisting of 4,4'-, 2,4'- and 2,2'-diphenyl methane diisocyanate and the isomeric mixtures thereof; mixtures of 4,4'-, 2,4'- and 2,2'-diphenyl methane diisocyanates and polyphenyl polymethylene polyisocyanates (crude MDI); 2,4- and 2,6-toluenediisocyanate and isomeric mixtures thereof; crude toluenediisocyanate; toluene diisocyanate distillation residues; and mixtures thereof.

5. The composition of claim 2 wherein the solvent is selected from the group consisting of acetone, methyl ethyl ketone, diisobutyl ketone, dimethyl formamide, tetrahydrofuran, pentane, hexane, dichloromethane, dimethyl acetamide, acetonitrile, methyl acetate, ethyl acetate, cyclohexanone, chloroform, toluene, nitromethane, triethyl amine, dimethyl sulfoxide, sulfur hexafluoride, dichloroethane, carbon disulfide and mixtures thereof.

6. The composition of claim 3 wherein the polymerization catalyst is selected from the group consisting of salts of carboxylic acids; amine-containing compounds; organo-metallic compounds; alkali hydroxides; alkali alcoholates; alkali metal carboxylates; soluble compounds of iron, sodium, potassium, and magnesium; triethylphosphine; and mixtures thereof.

7. The composition of claim 6 wherein the polymerization catalyst is a trimerization catalyst selected from the group consisting of N,N-dialkylpiperazine; the trialkylamines; triethylene diamine; the N,N',N''-tris(dialkylaminoalkyl)hexahydrotriazines; mono-, di-, and tri(dialkylaminoalkyl-monohydric phenols and thiophenols; alkali metal carboxylates; and mixtures thereof.

8. The composition of claim 7 wherein the trimerization catalyst is selected from the group consisting of trimethylamine, triethylamine, tributylamine, potassium acetate, potassium 2-ethyl hexanoate, and mixtures thereof.

9. The composition of claim 2 wherein the aliphatic or aromatic polyamine compound is selected from the group consisting of diethyl toluene diamine, toluene diamine, 3,3'-dichloro-4,4'-diaminodiphenylmethane, methylene dianiline, ethylene diamine, hexamethylene diamine, ethanol amine, diethanol amine, and mixtures thereof.

10. The composition of claim 2 wherein the admixture further contains particulate material selected from the group consisting of precipitated silica, perlite, aluminum silicate, calcium silicate, fumed silica and mixtures thereof, having a Brunauer, Emmett and Teller surface area of at least about 100 m$^2$/g.

11. A method of preparing a microporous polyurea xerogel composition comprising (1) admixing (a) a polyisocyanate component, (b) a substantially unreactive solvent, and (c) an aliphatic or aromatic polyamine compound; under reaction conditions sufficient to form a gel; and (2) removing the solvent under non-supercritical conditions sufficient to form a microporous polyurea xerogel composition having pores averaging less than about 50 microns in diameter and having a bulk density from about 1 to about 30 lb/ft$^3$ (about 16.0 to about 481 Kg/m$^3$).

* * * * *